No. 737,401. PATENTED AUG. 25, 1903.
S. P. HALLER.
FILTER.
APPLICATION FILED FEB. 7, 1903.
NO MODEL.
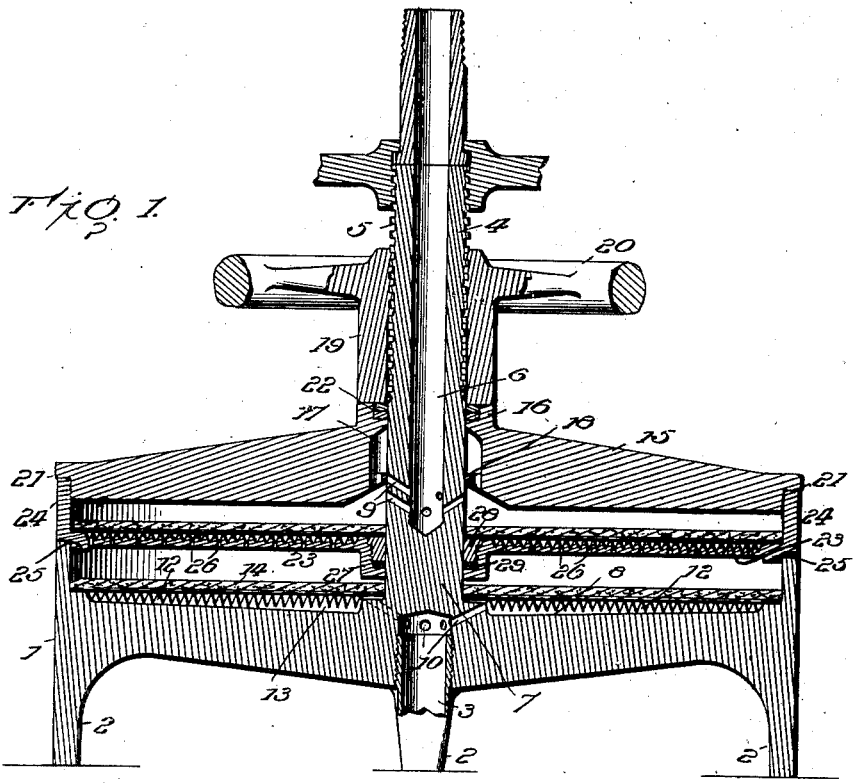
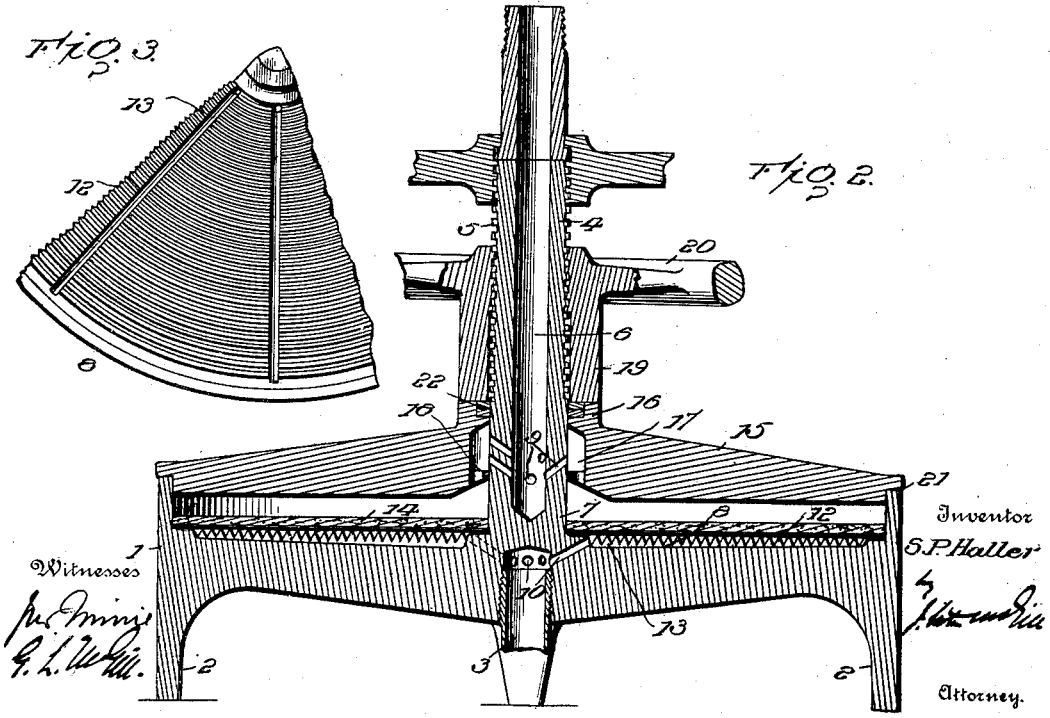
Witnesses
Inventor
S. P. Haller
Attorney.

No. 737,401. Patented August 25, 1903.

UNITED STATES PATENT OFFICE.

SAMUEL P. HALLER, OF PITTSBURG, PENNSYLVANIA.

FILTER.

SPECIFICATION forming part of Letters Patent No. 737,401, dated August 25, 1903.

Application filed February 7, 1903. Serial No. 142,295. (No model.)

*To all whom it may concern:*

Be it known that I, SAMUEL P. HALLER, of Pittsburg, in the county of Allegheny and State of Pennsylvania, have invented certain new and useful Improvements in Filters; and I do hereby declare the following to be a full, clear, and exact description of the invention, such as will enable others skilled in the art to which it appertains to make and use the same.

The primary object of this invention is the provision of improved means for securing the top of a filter and any desired number of filtering-disks within the filter, the single means serving to bind all the parts together.

A further object is to simplify and improve the construction of filters primarily designed for filtering liquors and aerated beverages.

The invention will be hereinafter fully set forth, and particularly pointed out in the claims.

In the accompanying drawings, Figure 1 is a vertical longitudinal sectional view of a filter constructed in accordance with my invention. Fig. 2 shows a slightly-different arrangement, filtering-disks being omitted. Fig. 3 is a plan view of a portion of the bottom of the filter.

Referring to the drawings, 1 designates a circular casing supported by legs 2 and having at its center an internally-threaded opening designed to receive the inner end of an outlet-pipe 3. In line with this opening extending upwardly from the bottom of the casing is a tubular stem or pipe 4, externally threaded for a portion of its length, as at 5. This stem is formed with a central passage 6, leading from its upper end to its lower solid portion 7, which latter extends downwardly to about the plane of the bottom 8 of the filter. The passage 6 opens into the filter through upwardly-inclined ports 9, while outlet from the filter into the pipe 3 is through ports 10, extending through the solid portion of the stem into the central threaded opening. The ports 9 are slanted upwardly, so as to obviate the danger of a horizontal jet under pressure contacting with and deranging the filtering composition. The bottom 8 of the casing is formed with a series of concentric grooves 12 and radial troughs 13, designed to conduct the liquid to the outlet-ports 10. The usual filtering composition of pulp and flannel, &c., (indicated at 14,) rests on the grooved bottom 8.

15 designates the cover, consisting of a circular plate having a collar 16 encircling the stem 4, the inner wall of the cover beneath the collar being cut away, as at 17, and having a guide-flange 18, formed with holes or openings. Bearing upon this collar is an internally-threaded sleeve 19, working on stem 4. By means of a hand-wheel 20, secured to or integral with the sleeve, the latter may be readily raised or lowered to release or bind the filter-cover. The periphery of the latter is rabbeted to form a flange 21, designed in the construction shown in Fig. 2 to rest directly on the wall of the casing. The cut-away portion 17 of the cover permits the latter to be lowered without obstructing the ports 9. By tightening down the screw-sleeve the cover will be firmly secured without the necessity of employing any fastening means at its periphery, and leakage at the center is prevented by a gasket 22.

When the liquid to be filtered requires greater filtration than that provided by the passage through a single filtering medium, one or more additional media may be introduced, each performing its own function separately from the others. In Fig. 1 I have shown a circular disk 23, having a peripheral ring or flange 24, corresponding to the wall of the casing. A series of such disks may be used. On their under sides near their peripheries the filter-disks are formed with depending flanges 25, forming rabbeted portions designed to accommodate the wall of the casing or the ring of the filter-disk beneath. The disks are provided with concentric grooves and openings 26, a separate filtering composition being employed for each disk. At their centers the several disks are formed with openings surrounded by collars 27, threaded to accommodate plugs 28, by which gaskets 29 are held to prevent leakage around the stem.

The parts are readily assembled, and when the cover is properly positioned the sleeve is screwed down until the cover is securely held to the flange of the uppermost disk or to the casing-wall when only one filtering medium is employed. It will be noted that by the construction described the tightening of the cover and disks is equally distributed, the force being applied to the center of the cover and all danger of leakage thus avoided without the necessity of peripheral locking means.

In constructing the filter to accommodate a series of disks the ports 9 are located higher on stem 4, so as to insure the introduction of the liquid onto the uppermost filtering-disk.

The advantages of my invention are apparent. In addition to the recited advantage of tightening the parts by the sleeve 19 the element coacting with such sleeve—namely, the stem 4—being tubular also serves as the inlet-passage for the liquid, thus economizing parts and cost of manufacture and rendering the device compact and durable.

While my invention is designed, primarily, for use in filtering wines and whisky, yet it is obvious that its use is not restricted.

I claim as my invention—

1. A filter comprising a cylindrical casing having an outlet, filtering means on the bottom of such casing above said outlet, an upright tubular stem extending from the bottom of the casing and having an inlet passage-way therein opening into the filter above the filtering means, a circular cover engaging at its periphery the wall of the casing, said cover having a central opening for said stem, a collar surrounding said opening, the inner wall of said cover being cut away beneath said collar, said inlet passage-way opening into the cut-away portion of said cover, and means mounted on the stem for engaging the cover at the center thereof for binding it at its periphery against the casing, as set forth.

2. A filter comprising a cylindrical casing having an outlet, filtering means on the bottom of such casing above said outlet, an upright exteriorly-threaded tubular stem extending from the bottom of the casing and having an inlet passage-way therein, ports leading from such passage-way into the casing above the filtering means, a circular cover for engaging at its periphery the wall of the casing and having a central opening to accommodate said stem, a collar surrounding said opening, the inner wall of said cover being cut away beneath said collar and provided with apertured flanges, said cover fitting against said stem at a point above said ports, a sleeve working in said thread for engaging said cover at the center thereof, and means connected to the sleeve for effecting the turning thereof, as set forth.

3. A filter comprising a cylindrical casing having an outlet, filtering means on the bottom of such casing, one or more superposed filtering-disks supported by the wall of the casing, each disk having its own filtering medium and formed with a peripheral ring, such rings constituting portions of the casing-wall, a central stem having an inlet passage-way and ports leading therefrom into the filter above the topmost filtering-disk, a cover having a central opening to accommodate said stem and having its periphery bearing on the ring of the topmost disk, and means mounted on the stem, for engaging said cover at its center for locking it and the several disks in place, as set forth.

4. A filter comprising a cylindrical casing having an outlet, filtering means on the bottom of such casing, one or more superposed filtering-disks supported by the wall of the casing, each disk having its own filtering medium and formed with a peripheral ring, such rings constituting portions of the casing-wall, an exteriorly-threaded stem having an inlet passage-way and ports leading therefrom into the filter above the topmost filtering-disk, a cover having a central opening to accommodate said stem and having its periphery bearing on the ring of the topmost disk, and an internally-threaded sleeve working on said stem for engaging said cover at its center for locking it and the several disks in place, as set forth.

5. A filter comprising a cylindrical casing having a central outlet, filtering means on the bottom of such casing, one or more superposed filtering-disks having each a peripheral ring, and a central opening, said rings of the superposed disks constituting portions of the casing-wall, a stem extended centrally through the disks having an inlet passage-way and ports leading therefrom into the filter above the topmost filtering-disk, said stem being externally threaded, a cover designed to fit at its periphery against the casing-wall as formed by the ring of the topmost filtering-disk, said cover having a central opening, an internally-threaded sleeve working on said stem, and a hand-wheel carried by such sleeve, substantially as set forth.

6. A filter comprising a cylindrical casing having a central outlet, filtering means on the bottom of such casing, one or more superposed filtering-disks having each a peripheral ring, and a central opening, said rings of the superposed disks constituting portions of the casing-wall, a stem extended centrally through the disks having an inlet passage-way and ports leading therefrom into the filter above the topmost filtering-disk, said stem being externally threaded, a cover designed to fit at its periphery against the casing-wall as formed by the ring of the topmost filtering-disk, said cover having a central opening, each disk also having a central opening to accommodate the stem, means in such openings to prevent leakage, an internally-threaded sleeve working on said stem, and a hand-wheel carried by such sleeve, substantially as set forth.

In testimony whereof I have signed this specification in the presence of two subscribing witnesses.

SAMUEL P. HALLER.

Witnesses:
GRAFTON L. MCGILL,
FRANCIS S. MAGUIRE.